US007739016B2

(12) United States Patent
Morris

(10) Patent No.: US 7,739,016 B2
(45) Date of Patent: Jun. 15, 2010

(54) PARAMETER STATE ESTIMATION

(75) Inventor: Robert L. Morris, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1118 days.

(21) Appl. No.: 11/386,262

(22) Filed: Mar. 22, 2006

(65) Prior Publication Data

US 2007/0225886 A1 Sep. 27, 2007

(51) Int. Cl.
*F16H 61/14* (2006.01)
(52) U.S. Cl. .......................................... 701/51; 303/112
(58) Field of Classification Search .................. 701/51, 701/67–71, 22; 303/112, 121, 138, 143, 303/155, 167; 477/34, 97, 143; 475/122, 475/128
See application file for complete search history.

(56) References Cited

U.S. PATENT DOCUMENTS 4,792,902 A * 12/1988 Hrovat et al. ............... 701/105

5,669,354 A * 9/1997 Morris ................... 123/406.24
5,730,094 A * 3/1998 Morris ..................... 123/192.1
6,299,565 B1 * 10/2001 Jain et al. .................... 477/143
6,574,535 B1 * 6/2003 Morris et al. .................. 701/22

FOREIGN PATENT DOCUMENTS

EP 1396368 A2 * 10/2004

* cited by examiner

*Primary Examiner*—Dalena Tran

(57) ABSTRACT

The state estimator provides parametric estimates for operating states not readily measurable with production powertrain and driveline hardware, such as real-time torque values of axles and dampers. This facilitates implementation of torque oscillation damping control schemes which use multivariable feedback. A control parameter is estimated for a powertrain system having multiple torque-generative devices operably connected to a transmission device having a torque output to a driveline. This includes establishing a plurality of equations operable to estimate the control parameter and other operating parameters based upon torque inputs. The operating parameters comprise operating speeds of the powertrain system and driveline. The operating parameters that comprise operating speeds of the powertrain system and driveline are determined. Coefficients of the plurality of equations are adjusted based upon the operating speeds of the powertrain system.

18 Claims, 6 Drawing Sheets

PARAMETER STATE ESTIMATION

TECHNICAL FIELD

This invention pertains generally to hybrid powertrain control systems, and more specifically to estimating parameter states for use in damping powertrain and driveline vibrations.

BACKGROUND OF THE INVENTION

Various hybrid powertrain architectures are known for managing the input and output torques of various prime-movers in hybrid vehicles, most commonly internal combustion engines and electric machines. One such hybrid powertrain architecture comprises a two-mode, compound-split, electro-mechanical transmission which utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

Engineers implementing powertrain systems encounter driveline vibrations, which typically range from unnoticeable to objectionable to an operator. Driveline vibrations are customer dissatisfiers, and may reduce service life of one or more driveline components. Typically, engineers attempt to manage driveline vibrations by implementing systems which operate to cancel torque oscillations at one specific frequency, or over a range of frequencies, or a set of frequencies chosen based upon gear ratio at which the driveline is currently operating. Such torque cancellation systems typically pass driveline inputs through signal conditioning filters, which slow system responsiveness. Slow system response often leads to a bump or overshoot that occurs when there is an aggressive operator torque request, due to delays in transient responses required to develop filters. Such systems often use a single feedback variable, typically engine speed, and command a single control signal, typically engine torque. However, single feedback/single control vibration control systems do not provide adequate damping in a system having multiple devices operable to generate vibrations in a driveline.

A hybrid powertrain system is exemplary of a system having multiple devices operable to generate vibrations in a driveline, which therefore drives a need for an alternative method and apparatus to control driveline vibrations. Feedback from such a driveline system which has multiple, varying operating states can be accomplished with a plurality of sensing devices operable to monitor and determine parameters for the operating states. However, some operating states may be difficult to sense directly, due to a lack of ability to directly sense certain operating states, e.g. torque, and added cost and complexity required to implement such sensing systems.

Therefore, there is a need to for a method and apparatus to estimate parameters of operating states of a hybrid driveline system, especially for operation of a vehicle equipped with a hybrid driveline that incorporates manual transmission configurations such as direct connection between an engine, torque-generative electric motors, and transmission input shafts.

SUMMARY OF THE INVENTION

The invention models or simulates the driveline as a system comprising multiple mass-spring devices having multiple degrees of freedom, and multiple torque control devices, including the powertrain having an engine, electrical motors, clutches, and other components, as other driveline components including wheels and wheel brakes, and road loads on the wheels. Dynamic responses comprising speed of each independent mass device and torque of each spring device in the system are modeled. The model is used as an estimator to estimate states, i.e. to predict speeds and torques, of each modeled driveline component. The estimated states are compared to desired states, determinable at least in part based upon user inputs. The results of the comparison are used as feedback to generate coordinated torque commands for each torque device in the driveline. Actual states, typically measured speeds, are compared to the estimated states to obtain errors, which are multiplied by a matrix of gain factors to add a coordinated correction to each estimated state. The matrix of gain factors is determined using known, common analytical techniques.

The state estimator can provide estimates for states not readily measurable with production powertrain and driveline hardware, such as real-time torque values of axles and dampers. Having real-time torque values of axles and dampers facilitates implementation of torque oscillation damping control schemes which use multivariable feedback. The state estimator provides estimates for states that are measurable but may have associated high levels of signal noise or other uncertainties. Such state estimators include wheel rotational speed and engine rotational speed. The state estimators for wheel and engine speed act similar to a low-pass or high signal filter without introducing a phase lag.

An aspect of the invention comprises a method and control system to estimate a control parameter for a powertrain system comprising a plurality of torque-generative devices operably connected to a transmission device having a torque output to a driveline. This includes establishing a plurality of equations operable to estimate the control parameter and a plurality of operating parameters based upon torque inputs. The operating parameters comprise operating speeds of the powertrain system and driveline. The operating parameters that comprise operating speeds of the powertrain system and driveline are determined. Coefficients of the plurality of equations are adjusted based upon the operating speeds of the powertrain system.

Another aspect of the invention comprises determining a transmission operating mode, and, adjusting the coefficients of the plurality of equations based upon the operating speeds of the powertrain system and the transmission operating mode.

Another aspect of the invention comprises adjusting the coefficients of the equations based upon the operating speeds of the powertrain system and the transmission operating mode determining estimator state errors based upon a difference between the operating speeds and the estimated operating speeds of the powertrain system and driveline, and selecting a gain matrix for adjusting the coefficients based upon the estimator state errors and the transmission operating mode.

Another aspect of the invention comprises the control parameters including a damper torque input to the driveline, and, a driveline axle torque. The operating parameters comprise operating speeds of the powertrain system and driveline, including operating speeds of each of the torque-generative devices, an output speed of the transmission, and a wheel speed.

Another aspect of the invention includes the torque inputs to the estimator, which comprise: torque outputs of each of the torque-generative devices; transmission clutch torques; brake torque; road load torque; and, accessory torque.

Another aspect of the invention comprises estimating an engine torque output, comprising: determining a damper torque error, comprising a difference between an estimated damper torque and a reference damper torque. An engine torque compensation algorithm is executed to calculate an engine torque correction value. An estimated actual engine torque is determined, based upon the engine torque correction value. Engine friction is determined, based upon estimated engine speed; and, the engine friction and the estimated actual engine torque are combined to achieve engine torque.

Another aspect of the invention comprises estimating transmission clutch torques. This comprises determining a magnitude of torque applied to each clutch, based upon commanded hydraulic pressure to each clutch, and, determining a magnitude of clutch slip for each clutch, based upon rotational speeds of the electrical machines and the monitored operating speeds of the powertrain system comprising a transmission output speed.

Another aspect of the invention comprises estimating a road load torque, which comprises: measuring a driven wheel speed and comparing the driven wheel speed to an estimated driven wheel speed. A compensation algorithm is executed to determine a road load correction term. A calculated road is determined based upon the average driven wheel speed. The calculated road load is adjusted with the road load correction term.

The road load estimator accommodates real-time changes in road load induced by changes in road grade, wind, and vehicle inertia.

The engine torque estimator accommodates changes in input torque to the transmission. The engine torque estimator determines engine torque input to the state estimator required to match the damper torque estimate.

The engine torque estimator and road load estimator allow for adaptation of the state estimator to accommodate changes in vehicle parameters, transmission losses, and, engine torque output errors.

The invention is used in a multivariate feedback control system which provides active driveline damping for a hybrid powertrain, or any powertrain that employs multiple torque-generative devices. The driveline is represented by a multiple mass-spring system, having multiple degrees of freedom, and multiple torque control devices. The dynamic response of the speed of each independent mass and the torque of each spring in the system is modeled. A desired trajectory for each speed and torque is computed and the actual speed and torques are compared to their respective desired trajectories. The vector of trajectory errors is multiplied by a matrix of feedback gains to form the coordinated commands sent to each torque-generative device. As such the entire dynamic trajectory of each component in the driveline is controlled. This eliminates axle overshoot, or first bump, in response to aggressive operator inputs, and provides complete control over all modes of oscillations that exist in the driveline. The feedback gain matrix values are preferably determined off-line for each transmission operating mode, i.e. each mode and gear configuration of the driveline, and stored as look-up tables in the controller. As the driveline switches among operating modes, the appropriate feedback gain matrix is selected from the look-up table. This approach provides dynamic coordination of all torque commands to control the transient response of the exemplary driveline using the hybrid transmission, including engine torque commands, electric motor torque commands, and clutch torque commands, as well as other controllable torque inputs.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
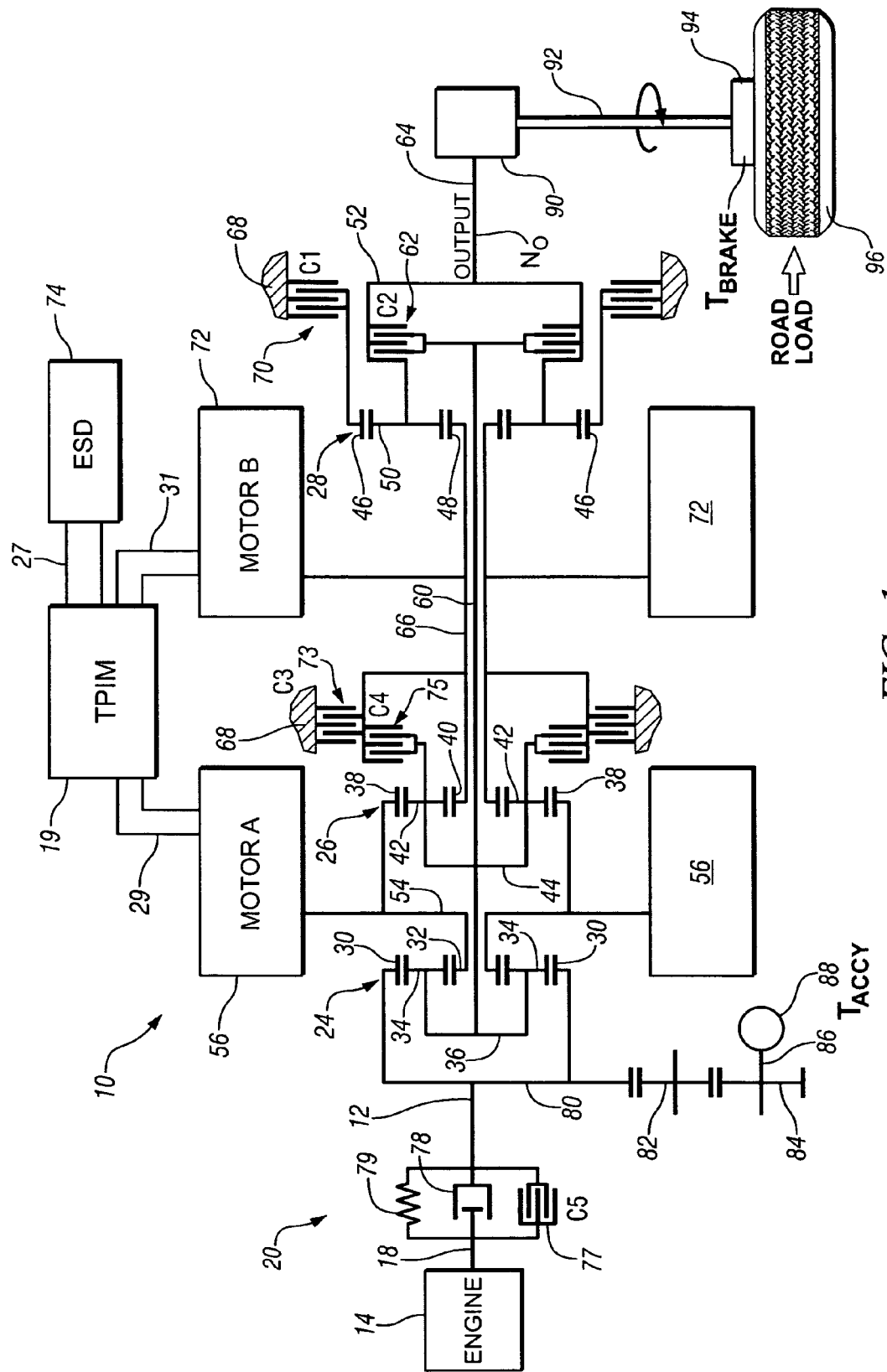
FIG. 1 is a schematic diagram of an exemplary powertrain, in accordance with the present invention.
Figure 2:
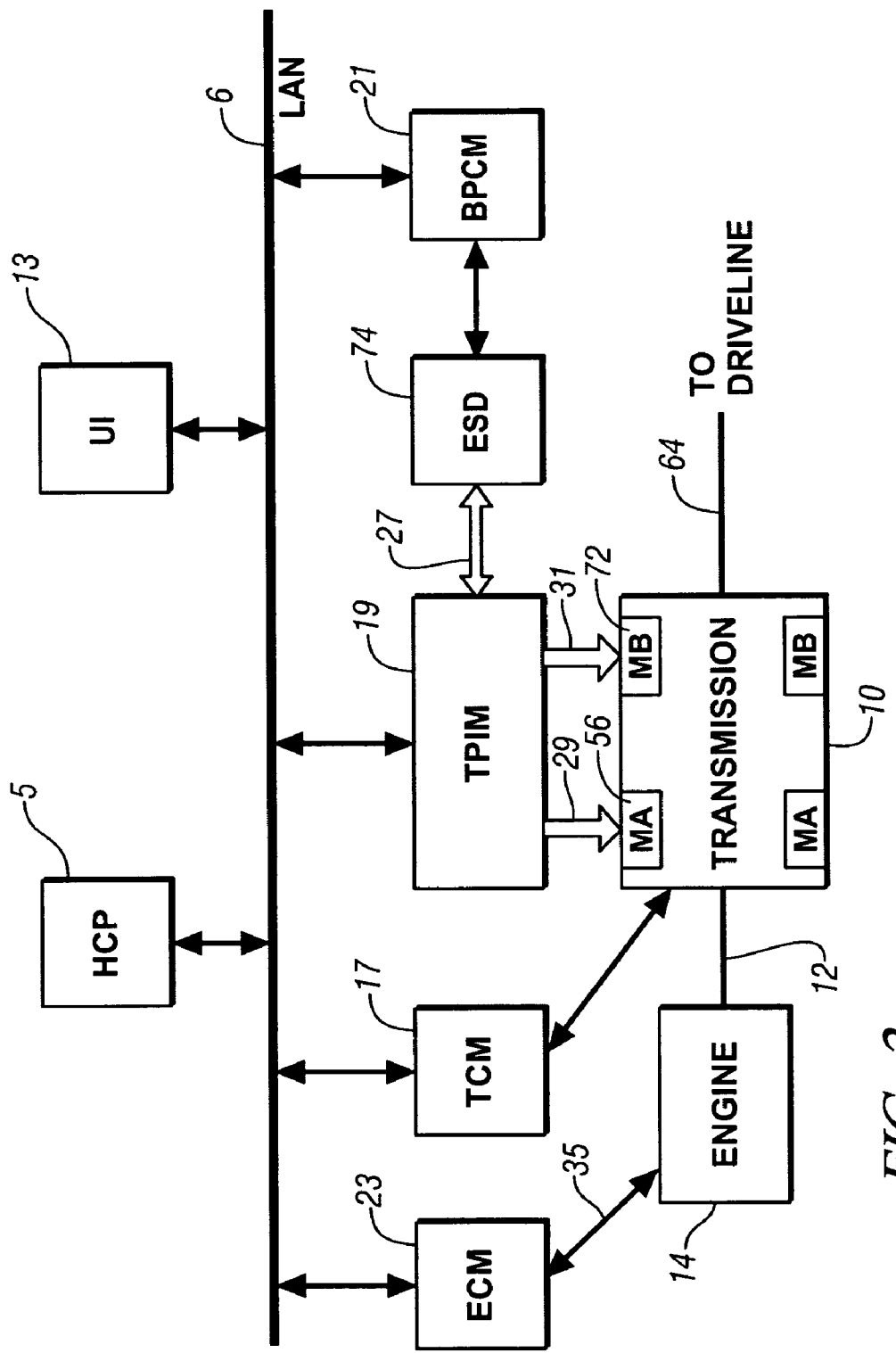
FIG. 2 is a schematic diagram of an exemplary architecture for a control system and powertrain, in accordance with the present invention; and, FIGS. 3, 4, 5, and 6 are schematic diagrams of an exemplary control system, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled *Two-Mode, Compound-Split, Hybrid Electro-Mechanical Transmission having Four Fixed Ratios*, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N\_CMD}$ for the various clutches C1, C2, C3, C4 of the hybrid transmission 10; and motor torque commands, $T_{A\_CMD}$ and $T_{B\_CMD}$, for the electrical motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved.

The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric motors A and B, designated as $\pm N_A$, $\pm N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the motors A and B 56, 72.

Figure 3:
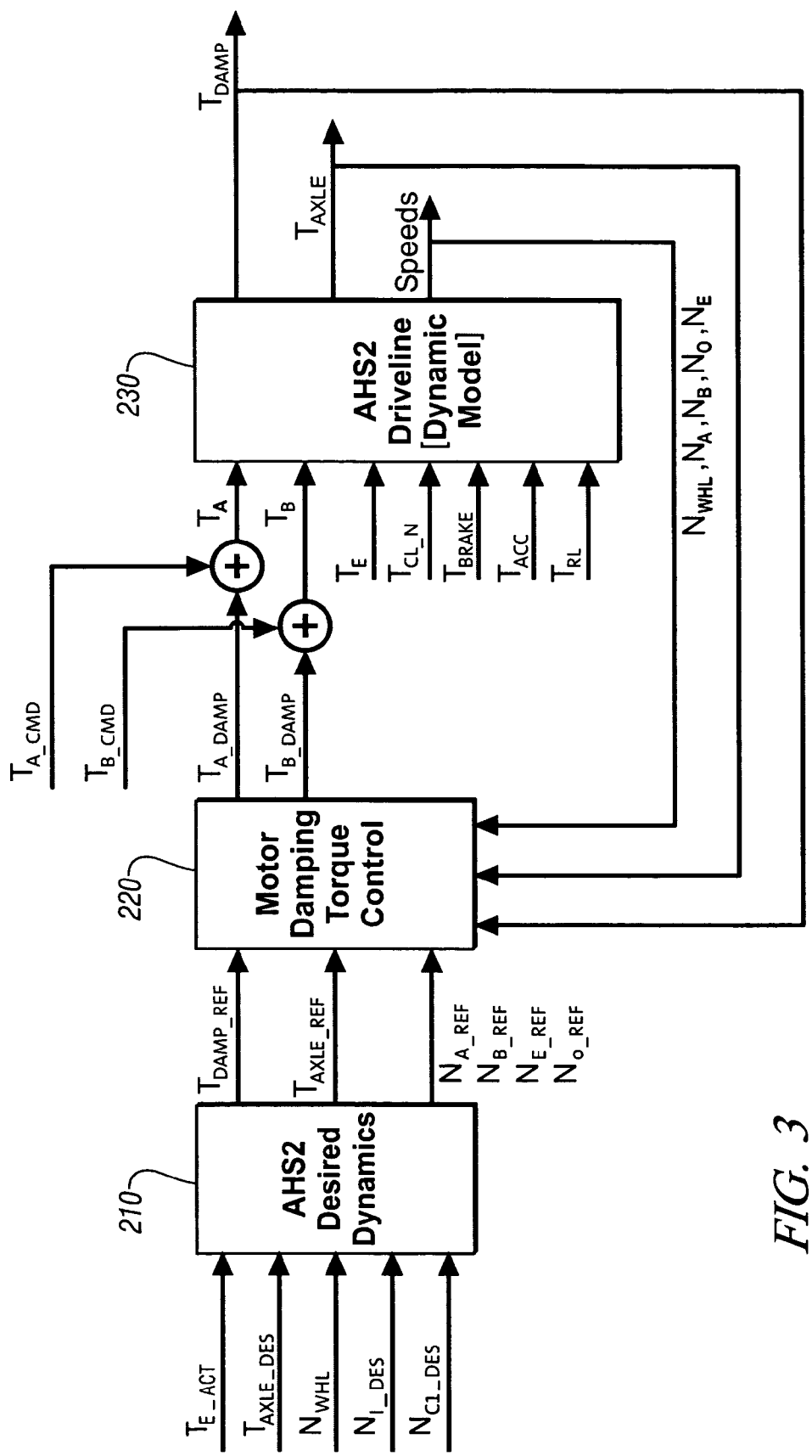

Referring now to FIG. 3, a control scheme is shown, comprising a multivariate feedback control system preferably executed as algorithms in the controllers of the control system described hereinabove with reference to FIG. 2, to control operation of the system described with reference to FIG. 1. The control scheme described hereinafter comprises a subset of overall vehicle control architecture. The control scheme comprises a method and apparatus for multivariate active driveline damping. An exemplary method and apparatus for multivariate active driveline damping is described in commonly assigned and co-pending U.S. Ser. No. 11/386,337 entitled METHOD AND APPARATUS FOR MULTIVARIATE ACTIVE DRIVELTNE DAMPING. The exemplary multivariate feedback control method and system comprises basic elements for controlling torque outputs from the torque-generative devices 14, 56, 72 through the transmission 10 to the driveline. This includes the overall control elements of determining desired operating state parameters for the powertrain system and the driveline 210; determining a plurality of operating state errors, including motor damping torque control 220; and, executing driveline dynamic control to control each torque-generative device, based upon the operating state errors.

Figure 4:
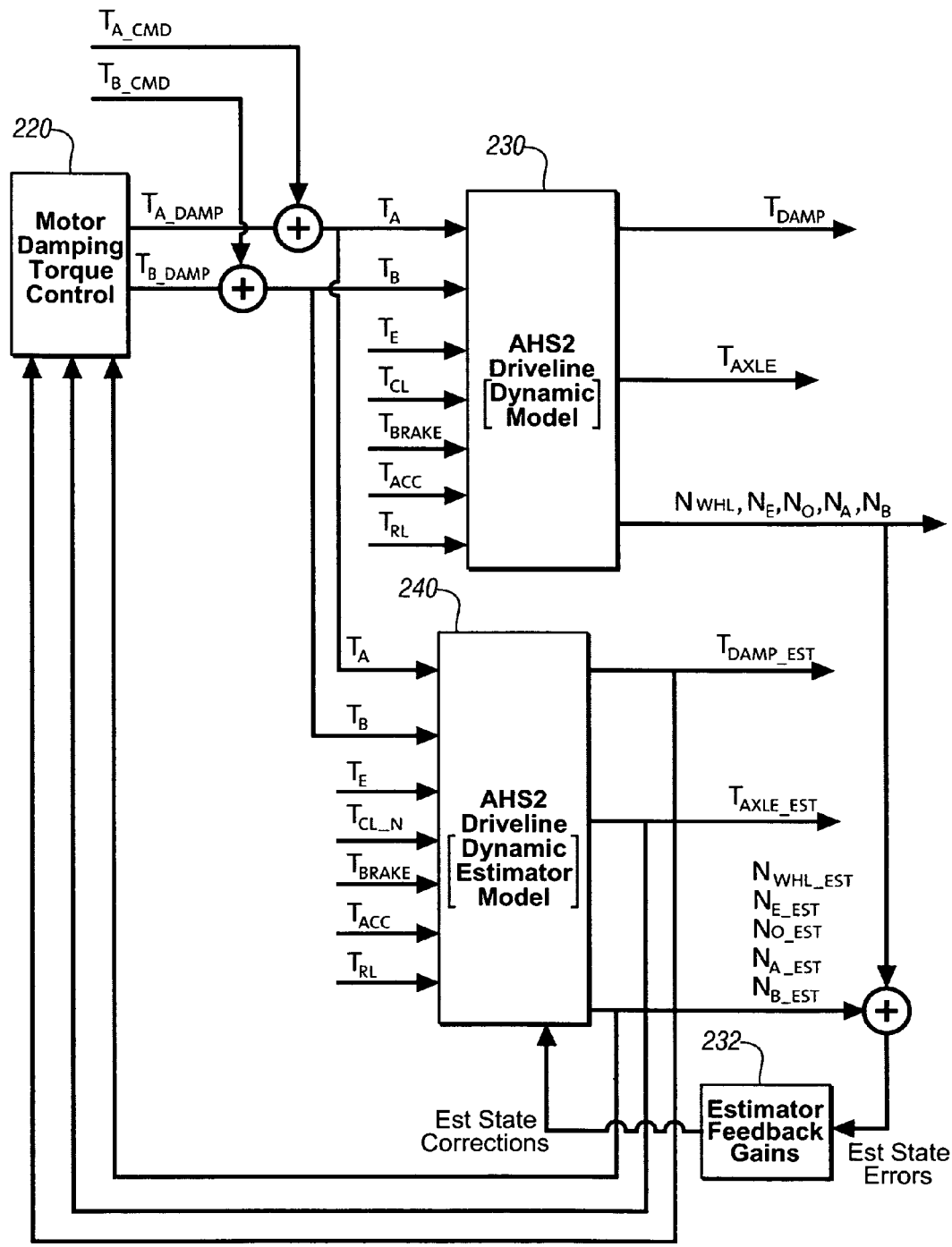

Referring now to FIG. 4, the method and apparatus for estimating state parameters for multivariate driveline having a driveline dynamics estimator 240, is shown. In overall operation, the driveline dynamics estimator 240 is a mathematical model comprising a plurality of linear equations executed as algorithms within one of the controllers. The mathematical model equations, including calibration values, comprise algorithmic representations of operation of the exemplary driveline described with reference to FIGS. 1 and 2, taking into account application-specific masses, inertias, friction factors, and other characteristics and parameters of the driveline that affect various operating states. The method to estimate state parameters for the aforementioned powertrain system includes monitoring operating rotational speed for each of the torque-generative devices, in this case motor A 56, motor B 72, and input speed, $N_E$, from the engine 14 at shaft 12. Output rotational speed of the transmission 10 at shaft 64 is measured. Torque commands, $T_A$, $T_B$, $T_E$, to the torque-generative devices are determined. A plurality of driveline torque loads are also determined and used as input. The aforementioned mathematical model equations are executed in one of the controllers to determine an estimated parameter for each of the following parameters: $T_{DAMP}$, $T_{AXLE}$, $N_A$, $N_B$, $N_O$, $N_E$, and $N_{WHL}$.

Control parameters preferably comprise $T_{DAMP}$ and $T_{AXLE}$, i.e. those parameters the control system is acting to control. Operating parameters preferably comprise $N_A$, $N_B$, $N_O$, $N_E$, and $N_{WHL}$, i.e. those parameters the control system is able to measure using sensing systems on the powertrain system.

The driveline dynamics estimator 240 uses as inputs the following parameters: the torque commands to the torque-generative devices, and the torque loads to estimate control parameters, $T_{DAMP}$ and $T_{AXLE}$. A plurality of equations are executed as a matrix in the estimator 240, which is operable to estimate the control parameters and operating parameters. The operating parameters comprise operating speeds $N_A$, $N_B$, $N_O$, $N_E$, and $N_{WHL}$, and torque inputs including motor torque values, $T_A$ and $T_B$, engine torque $T_E$, clutch torques $T_{CL\_N}$, to clutches C1, C2, C3, C4, brake torque $T_{BRAKE}$, accessory load $T_{ACC}$, and road load, $T_{RL}$. Parameters for the operating speeds $N_A$, $N_B$, $N_O$, $N_E$, and $N_{WHL}$ are estimated. A difference between the measured operating speeds $N_A$, $N_B$, $N_O$, $N_E$, and $N_{WHL}$, and estimated operating speeds $N_A$, $N_B$, $N_O$, $N_E$, and $N_{WHL}$ is determined, and coefficients for the plurality of equations are adjusted based upon the determined differences in operating speeds of the powertrain system. The distributed controller architecture described with reference to FIG. 2, and the algorithmic structure described herein is executed in a manner that causes the estimation of the aforementioned parameters to be achieved in real-time, i.e. there is limited or no lag time in determining the various states, thus eliminating or minimizing potential for loss of control of the system. A skilled practitioner is able to determine system dynamics, including natural frequencies of the components and system. The control system executes the algorithms in a minimum quantity of controller clock cycles to ensure that changes to the control parameters occur at a frequency substantially less than the dynamics of the system, to eliminate any risk of instability in the system, thus avoiding operator dissatisfaction.

Input parameters to the driveline dynamics estimator 240 include motor torque values, $T_A$ and $T_B$, engine torque $T_E$, clutch torques $T_{CL\_N}$, to clutches C1, C2, C3, C4, brake torque $T_{BRAKE}$, accessory load $T_{ACC}$, and road load, $T_{RL}$, and the transmission operating mode. The aforementioned inputs are applied to the matrix equation to dynamically calculate estimated output state parameters of the driveline, including $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$ based upon the input parameters. A first matrix comprising the estimated speeds $N_{A\_EST}$, $N_{B\_EST}$, $N_{O\_EST}$, $N_{E\_EST}$, $N_{WHL\_EST}$ is subtracted from a second matrix comprising measured speeds $N_A$, $N_B$, $N_O$, $N_E$, $N_{WHL}$. The resultant matrix is multiplied by one of a plurality of gain matrices, executed in block 232, to determine a matrix of estimated state corrections, or coefficients. Each of the plurality of gain matrices comprises a matrix of scalar gain factors, preferably determined for each transmission operating mode, i.e. the specific operating mode and gear configuration, described hereinabove with reference to Table 1. In this embodiment the gain factors are determined off-line, and stored as calibration values in one of the on-board controllers.

The matrix of estimated state corrections output from block 232 is used as feedback by the driveline dynamics estimator 240 in determining the dynamically calculated estimated output states of the driveline, including $T_{DAMP\_EST}$, $T_{A\_EST}$, $N_{A\_EST}$, $N_{B\_EST}$, $N_{O\_EST}$, $N_{E\_EST}$, and $N_{WHL\_EST}$ based upon the input parameters. When the matrix comprising the estimated speeds $N_{A\_EST}$, $N_{B\_EST}$, $N_{O\_EST}$, $N_{E\_EST}$, $N_{WHL\_EST}$ is equal to the matrix comprising measured speeds $N_A$, $N_B$, $N_O$, $N_E$, $N_{WHL}$, it is determined that the outputs of the estimator, comprising $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$ are accurate measurements of actual operating states of the driveline. The outputs of the estimator, comprising $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$, are used as a feedback matrix to the multivariate motor damping control scheme 220 to control motor A 56 and motor B 72. Therefore, the feedback control model shown in FIG. 4 effectively replaces the feedback control model shown in FIG. 3, for controlling driveline dynamics in the exemplary system.

Furthermore, one or more of the inputs to the driveline dynamics estimator 240 may be determined by the estimation methods described herein. The estimated input parameters comprise operating parameters for engine torque $T_E$, clutch torques $T_{CL\_N}$, to clutches C1, C2, C3, C4, vehicle brake torque $T_{BRAKE}$, accessory load $T_{ACC}$, and road load, $T_{RL}$.

Figure 5:
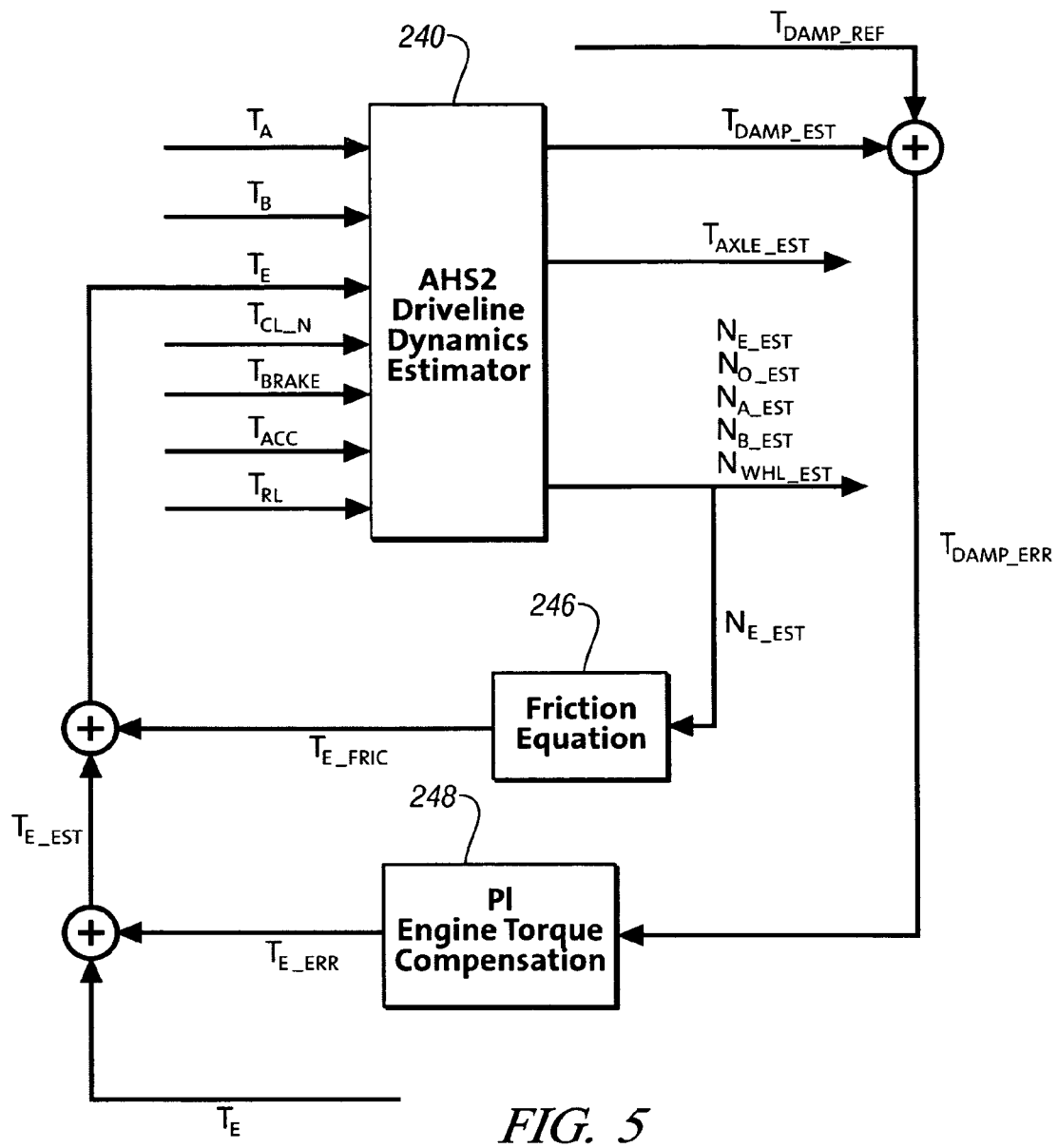

Referring now to FIG. 5, estimation of engine torque $T_E$ is described. In this estimator, a damper torque error, $T_{DAMP\_ERR}$ is determined by calculating a difference between estimated damper torque, $T_{DAMP\_EST}$ and reference damper torque, $T_{DAMP\_REF}$, which is the reference input torque to the transmission at shaft 12, after the transient torque damper 20, described hereinabove with reference to FIG. 3. The damper torque error, $T_{DAMP\_ERR}$ is input to a known proportional-integral engine torque compensation algorithm (see block 248), to calculate an engine torque correction factor, $T_{E\_ERR}$. An estimated engine torque, $T_{E\_EST}$, is determined as a difference between engine torque correction factor, $T_{E\_ERR}$, and actual engine torque, $T_E$. Engine friction, $T_{E\_FRIC}$ is calculated based upon estimated engine speed, $N_{E\_EST}$, which is input to a known friction equation (see block 246). The engine friction, $T_{E\_FRIC}$ and the estimated engine torque, $T_{E\_EST}$ are added to calculate the engine torque, $T_E$, which is input to the driveline dynamics estimator 240.

Figure 6:
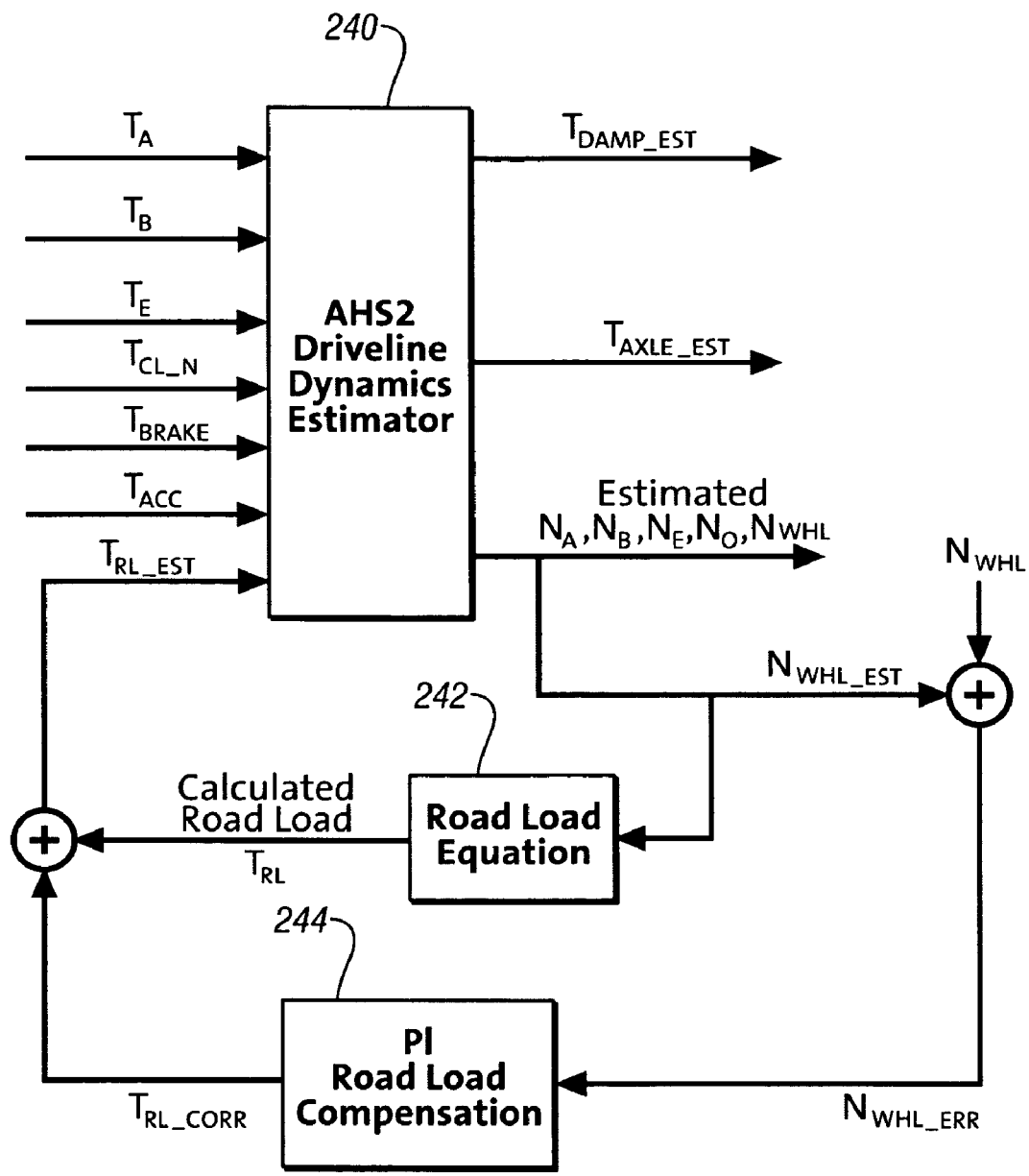

Referring now to FIG. 6, estimation of road load, $T_{RL\_EST}$ is described. This estimator comprises measuring average driven wheel speed, $N_{WHL}$ and comparing it to an estimated average driven wheel speed, $N_{WHL\_EST}$, which is output from the dynamics estimator 240. The average driven-wheel speed, $N_{WHL}$ is preferably based upon raw signal inputs from wheel speed sensors mounted on each of the driven wheels. An error term, $N_{WHL\_ERR}$, is generated, which is input to a known proportional-integral road load compensation algorithm for determining road load compensation, and a correction term, $T_{RL\_CORR}$, is calculated (block 244). The estimated average driven wheel speed, $N_{WHL\_EST}$, is input to an algorithm for determining road load 242 to determine a calculated road load, $T_{RL}$. The algorithm for determining road load based upon estimated average driven wheel speed, $N_{WHL\_EST}$ presupposes a known value for road load of the vehicle over a range of driven wheel speeds, which is determinable during vehicle development, and is based upon vehicle inertia, drag coefficients, and other known load factors. The correction term, $T_{RL\_CORR}$ makes adjustments for changes in road load, compensating for such changing factors as vehicle mass, wind speed, tire inflation levels, and others. The correction term is added to the calculated road load, $T_{RL}$ to determine the estimated road load, $T_{RL\_EST}$.

Estimation of accessory load $T_{ACC}$ comprises a predetermined calibration of energy consumed by a main hydraulic pump, which is used by the transmission for clutch control, determinable as a function of magnitude of damper torque, $T_{DAMP}$.

Estimation of clutch torques $T_{CL\_N}$ comprises determining magnitude of torque applied to each of clutches C1, C2, C3, C4, based upon commanded hydraulic pressure to each of the clutches, transmission operating mode, indicating which of clutches C1, C2, C3, C4 are actuated, and magnitude of clutch slip. Magnitude of clutch slip is determinable based upon rotational speeds of motors A and B, i.e. $N_A$ and $N_B$, and transmission output speed, No.

Estimation of vehicle brake torque $T_{BRAKE}$ comprises a measure of applied brake torque, based upon operator input to the vehicle brake pedal, measurable through the UI 13.

The feedback state parameters, $T_{DAMP}$, $T_{AXLE}$, $N_A$, $N_B$, $N_O$, $N_E$, $N_{WHL}$ are determinable by direct measurement of the specific parameter using one or more sensors which input data to one of the controllers, possibly subjected to analog to digital conversion, filtering, calibration, and other manipulations, to attain a signal representative of the measured parameter. Direct measurement of parameters with sensors is well-known. Alternatively, one or more of the feedback state parameters, $T_{DAMP}$, $T_{AXLE}$, $N_A$, $N_B$, $N_O$, $N_E$, $N_{WHL}$ may be determined by estimation, using one or more feedback-based inference equations executed as algorithms in the control system.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to estimate a control parameter for a powertrain system, the powertrain system comprising a plurality of torque-generative devices operably connected to a transmission device having a torque output to a driveline, comprising:
    establishing a plurality of equations operable to estimate the control parameter and a plurality of operating parameters based upon a plurality of torque inputs, said plurality of operating parameters comprising operating speeds of the powertrain system and driveline, said plurality of torque inputs comprising at least one of torque outputs of each of the torque-generative devices, transmission clutch torques, brake torque, road load torque, and accessory torque;
    determining the operating parameters that comprise operating speeds of the powertrain system and driveline; and
    adjusting coefficients of the plurality of equations based upon the operating speeds of the powertrain system;
    wherein said transmission clutch torques are estimated by
        determining a magnitude of torque applied to each clutch, based upon commanded hydraulic pressure to each clutch, and
        determining a magnitude of clutch slip for each clutch, based upon rotational speeds of the electrical machines and the operating speeds of the powertrain system comprising a transmission output speed.

2. The method of claim 1, further comprising determining a transmission operating mode, and, adjusting coefficients of the plurality of equations based upon the operating speeds of the powertrain system and the transmission operating mode.

3. The method of claim 2, wherein adjusting coefficients of the plurality of equations based upon the operating speeds of the powertrain system and the transmission operating mode further comprises:
    determining a plurality of estimator state errors based upon a difference between the operating speeds and the estimated operating speeds of the powertrain system and driveline;
    selecting a gain matrix for adjusting the coefficients based upon the estimator state errors and the transmission operating mode.

4. The method of claim 1, wherein the control parameter comprises one of a damper torque input to the driveline, and, a driveline axle torque.

5. The method of claim 1, wherein the plurality of operating parameters comprising operating speeds of the powertrain system and driveline comprise: operating speeds of each of the torque-generative devices, an output speed of the transmission, and a wheel speed.

6. The method of claim 1, wherein the plurality of torque-generative devices comprises an engine torque output, and wherein the engine torque output is estimated by
    determining a damper torque error, comprising a difference between an estimated damper torque and a reference damper torque;
    executing an engine torque compensation algorithm to calculate an engine torque correction value;
    determining an estimated actual engine torque, based upon the engine torque correction value;
    determining engine friction, based upon estimated engine speed; and,
    combining the engine friction and the estimated actual engine torque.

7. The method of claim 1, wherein road load torque is estimated by
    measuring a driven wheel speed;
    comparing the driven wheel speed to an estimated driven wheel speed;
    executing a compensation algorithm to determine a road load correction term;
    determining a calculated road based upon the average driven wheel speed; and,
    adjusting the calculated road load with the road load correction term.

8. Control system, comprising a storage medium having a computer program encoded therein for effecting a method to estimate a control parameter for a powertrain system, the powertrain system comprising a plurality of torque-generative devices operably connected to a transmission device operable to supply a torque output to a driveline, the controller operable to monitor operating parameters of the powertrain system and driveline, the program comprising:
    code comprising a plurality of equations operable to estimate the control parameter and a plurality of operating parameters based upon a plurality of torque inputs, said plurality of operating parameters comprising operating speeds of the powertrain system and driveline, said plurality of torque inputs comprising at least one of torque outputs of each of the torque-generative devices, transmission clutch torques, brake torque, road load torque, and accessory torque;

code to determine the operating parameters comprising operating speeds of the powertrain system and driveline; and, code to adjust coefficients of the plurality of equations based upon the operating speeds of the powertrain system;

wherein said transmission clutch torques are estimated by code to determine a magnitude of torque applied to each clutch, based upon commanded hydraulic pressure to each clutch, and code to determine a magnitude of clutch slip for each clutch, based upon rotational speeds of the electrical machines and the monitored operating speeds of the powertrain system comprising a transmission output speed.

9. The control system of claim 8, further comprising code to determine a transmission operating mode, and, code to adjust coefficients of the plurality of equations based upon the monitored operating speeds of the powertrain system and the transmission operating mode.

10. The control system of claim 9, wherein the code to adjust coefficients of the plurality of equations based upon the monitored operating speeds of the powertrain system and the transmission operating mode further comprises:

code to determine a plurality of estimator state errors based upon a difference between the monitored operating speeds and the estimated operating speeds of the powertrain system and driveline;

code to select a gain matrix to adjust each of the coefficients based upon the estimator state errors and the transmission operating mode.

11. The control system of claim 8, wherein the control parameter comprises one of a damper torque input to the driveline, and, a driveline axle torque.

12. The control system of claim 8, wherein the plurality of operating parameters comprising operating speeds of the powertrain system and driveline comprise: operating speeds of each of the torque-generative devices, an output speed of the transmission, and a wheel speed.

13. The control system of claim 8, wherein the plurality of torque-generative devices comprises an engine torque output, and wherein the engine torque output is estimated by code to determine a damper torque error, comprising a difference between an estimated damper torque and a reference damper torque;

code to execute an engine torque compensation algorithm to calculate an engine torque correction value;

code to determine an estimated actual engine torque, based upon the engine torque correction value;

code to determine engine friction, based upon estimated engine speed; and, code to combine the engine friction and the estimated actual engine torque.

14. The control system of claim 8, wherein road load torque is estimated by code to measure a driven wheel speed;

code to compare the driven wheel speed to an estimated driven wheel speed;

code to execute a compensation algorithm to determine a road load correction term;

code to determine a calculated road based upon the average driven wheel speed; and, code to adjust the calculated road load with the road load correction term.

15. The control system of claim 8, wherein the computer program encoded therein is operable to execute in a minimum quantity of computer clock cycles.

16. The control system of claim 8, wherein the computer program encoded therein is operable to execute in a quantity of computer clock cycles less than that quantity which causes dynamic instability of the driveline.

17. The control system of claim 8, wherein the torque-generative devices comprise an internal combustion engine, and, a pair of electrical machines.

18. The control system of claim 8, wherein the transmission comprises to a two-mode, compound-split, electro-mechanical hybrid transmission.

* * * * *